（12） United States Patent
Suggs

(10) Patent No.: US 8,593,434 B2
(45) Date of Patent: Nov. 26, 2013

(54) TOUCHSCREEN DISPLAY WITH PLURAL CAMERAS

(75) Inventor: Bradley Neal Suggs, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 319 days.

(21) Appl. No.: 13/056,977

(22) PCT Filed: Sep. 15, 2008

(86) PCT No.: PCT/US2008/076469
§ 371 (c)(1),
(2), (4) Date: Jan. 31, 2011

(87) PCT Pub. No.: WO2010/030296
PCT Pub. Date: Mar. 18, 2010

(65) Prior Publication Data
US 2011/0134036 A1   Jun. 9, 2011

(51) Int. Cl.
*G06F 3/042* (2006.01)
(52) U.S. Cl.
USPC .......................................... 345/175
(58) Field of Classification Search
USPC ................................. 345/173, 175
See application file for complete search history.

(56) References Cited

U.S. PATENT DOCUMENTS

| 7,355,594 B2 | 4/2008 | Barkan |
| 2005/0190162 A1 | 9/2005 | Newton |
| 2006/0044282 A1 | 3/2006 | Pinhanez et al. |
| 2008/0143682 A1 | 6/2008 | Shim et al. |
| 2008/0150913 A1* | 6/2008 | Bell et al. ...................... 345/175 |
| 2010/0029255 A1* | 2/2010 | Kim et al. .................. 455/414.2 |
| 2010/0245287 A1* | 9/2010 | Thorn ........................... 345/175 |

FOREIGN PATENT DOCUMENTS

| EP | 1645944 | 4/2006 |
| EP | 2229617 | 9/2010 |
| JP | 2006163751 | 6/2006 |

OTHER PUBLICATIONS

WIPO, International Search Report, dated May 22, 2009, PCT/US2008/076469 filed Sep. 15, 2008.
Bradley Suggs, UKIPO, First Office Action dated Mar. 20, 2012, GB1104407.0 filed Mar. 16, 2011.

* cited by examiner

*Primary Examiner* — Kevin M Nguyen

(57) ABSTRACT

A display system (AP1) has plural cameras (11L an d11R) having fields of view (31L and 31R) that extend more orthogonal to than parallel to a display screen (21) for viewing distal objects. Reflectors (33L and 33R) redirect touchscreen light (36) from a direction along the display screen to a direction toward the cameras. A video processor (19) locates a 2D position relative to the display screen of an object proximate to the display screen as a function of images generated by the cameras in response to the touchscreen light.

9 Claims, 3 Drawing Sheets

TOUCHSCREEN DISPLAY WITH PLURAL CAMERAS

BACKGROUND

A "touchscreen" is a display that can detect the presence and location of a touch, e.g., by a finger, within the display area. Touchscreen capabilities can be enabled by a range of technologies including resistive, surface acoustic wave, capacitive, infrared, strain gage, diffused laser imaging, optical imaging, dispersive signal technology, and acoustic pulse recognition. A touchscreen allows user input without requiring a separate device such as a mouse or trackpad. Unlike those devices, a touchscreen enables a user to interact with what is displayed directly on the screen, where it is displayed, rather than indirectly.

Touchscreens are incorporated increasingly in small devices such as cell phones, PDAs, digital audio players, and navigation units. Large touchscreen displays are also increasingly common in kiosks and other commercial settings. However, displays for desktop computers usually do not provide touchscreen capabilities.

TouchSmart™ computers, available from Hewlett-Packard Company, are notable exceptions. The computers include and are visually dominated by a touchscreen display. Infrared emitters at the upper corners of the display radiate light that is normally reflected by opposing display bezels. Linear detector arrays detect the reflections and any shadows to locate a touch trigonometrically. The touchscreen capabilities add significantly to the cost of the computers.

BRIEF DESCRIPTION OF THE DRAWINGS

The features and advantages of the invention as well as additional features and advantages thereof will be more clearly understood hereinafter as a result of a detailed description of a preferred embodiment of the invention when taken in conjunction with the following drawings in which.

These figures depict implementations/embodiments of the invention and not of the invention itself.

DETAILED DESCRIPTION

The present invention provides for using a pair of webcams (e.g., instead of a pair of linear array sensors) to provide touchscreen functionality. Cost-savings are achieved in part due to economies of scale: webcam sensors are less expensive than, for example, the linear sensors used in some touchscreen implementations. Cost-effectiveness is further enhanced since the cameras can also be used as webcams, providing for stereo imaging and 3D gesture control.

Figure 1:
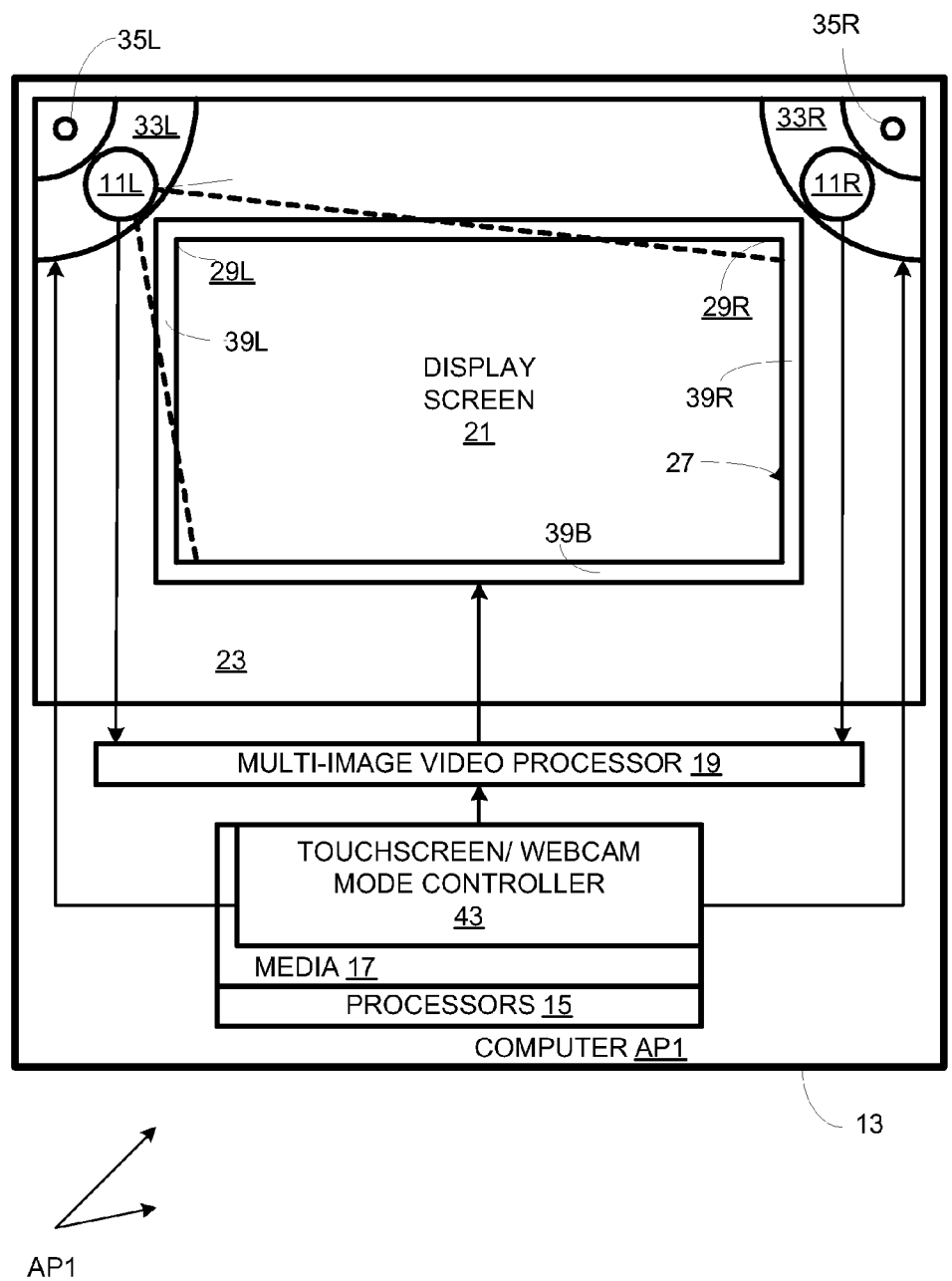
FIG. 1 is a schematic diagram of a computer system incorporating a touchscreen display in accordance with an embodiment of the invention.

An all-in-one computer AP1 in accordance with an embodiment of the invention is shown in FIG. 1. Computer AP1 has stereo cameras 11L and 11R, which are used: 1) for touchscreen functionality and 2) webcam functionality, in other words for imaging and for tracking finger or stylus position on a display. While the illustrated embodiment relates to an all-in-one computer (computer and display as monolithic unit), other embodiments relate to a display that is separate from the computer itself.

Figure 2:
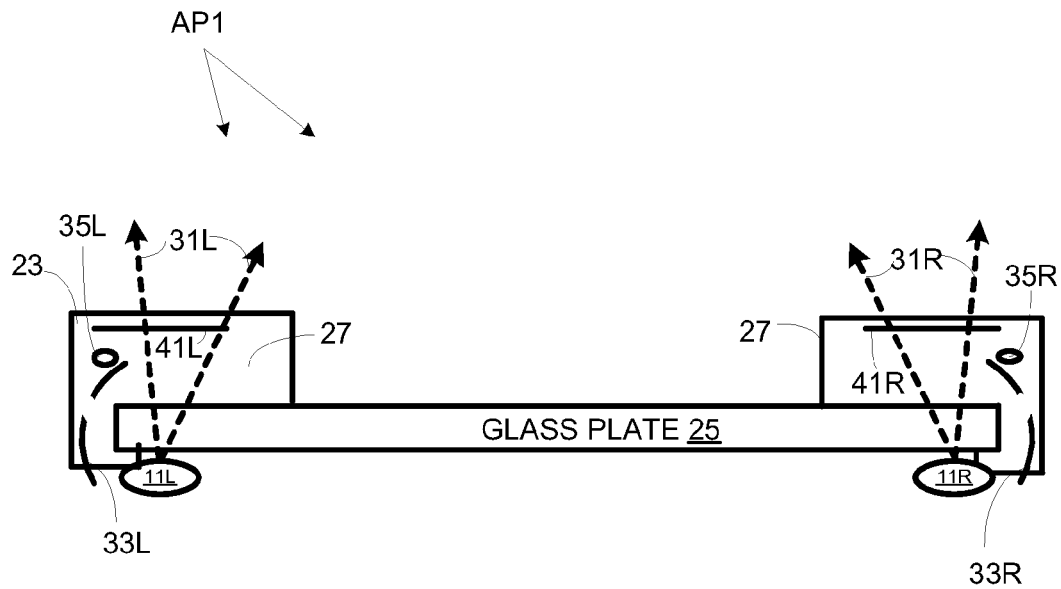
FIG. 2 is a schematic top plan view of a display of FIG. 1 with reflectors in "webcam-mode" positions permitting sensors to be used as a stereo webcam.
Figure 3:
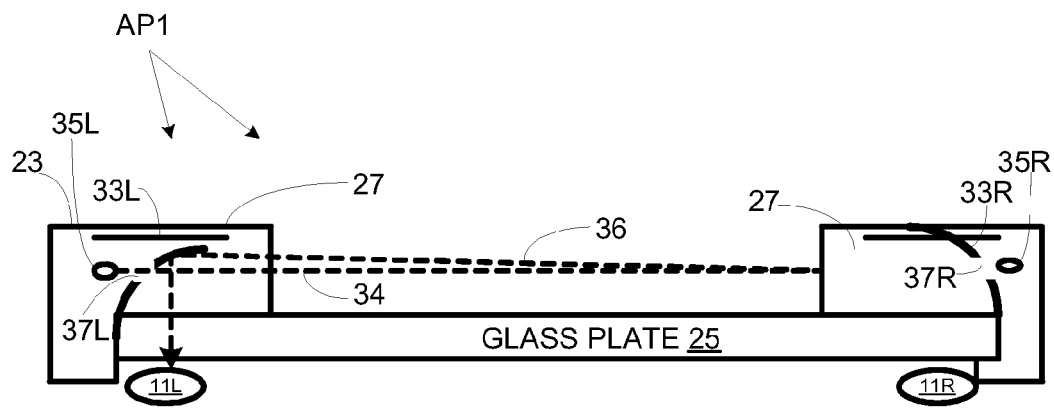
FIG. 3 is a schematic top plan view of the display of FIG. 1 with reflectors in "touchscreen-mode" positions permitting sensors to be used to effect touchscreen capabilities.

All-in-one computer AP1 includes a housing 13, processors 15, computer-readable storage media 17 (including main memory, disk, and flash based storage), a multi-image video processor 19, and communications (including I/O) devices, including a display screen 21. Housing 13 provides a frame 23 for display screen 21, which includes a glass plate 25, as shown in FIGS. 2 and 3. Frame 23 and display screen 21 are bridged by a retroreflective bezel 27.

Cameras 11L and 11R are located beneath glass plate 25 near respective upper corners 29L and 29R of display screen 21, shown in FIG. 1. Cameras 11L and 11R (FIG. 1) have respective fields of view 31L and 31R (FIG. 2). Fields of view 31L and 31R are directed generally outward, with some inclination toward their common center so that they converge toward an expected user position as desired for their uses as stereo webcams and for 3D gesture control. Even with the inclination, fields of view 31L and 31R are more orthogonal to than parallel to (the 2D surface of) display screen 21. This allows cameras 11L and 11R to detect "object light" from objects centered relative to and at least a foot from display screen 21 so that the objects can be imaged.

So that cameras 11L and 11R can be used for touchscreen functionality, eyelid reflectors 33L and 33R can be moved to positions respectively occluding fields of view 31L and 31R (FIG. 2). In these positions, reflectors 33L and 33R cause "touchscreen" light arriving from bezel 27 along display screen 21 (and thus not within fields of view 31L and 31R) to be redirected toward respective cameras 11L and 11R. In one embodiment, this light is provided by an emissive bezel surface. In the illustrated embodiment, this light is provided by point-source infrared emitters 35L and 35R, roughly co-located with the cameras 11L and 11R, respectively. In this case, bezel 27 is retroreflective in that incident light 34 from an emitter 35L, 35R is reflected as touchscreen light 36 back toward the emitter by the bezel with a minimum of scattering, as shown in FIG. 3. Eyelid reflectors 33L and 33R have respective apertures 37L and 37R (FIG. 3), through which light from emitters 35L and 35R is directed toward opposing sides of retroreflective bezel 27.

Each emitter 35L, 35R emits infrared light (IR) 35 and directs it to the two opposite sides of bezel 27. More specifically, emitter 35L directs IR light to the bottom side 39B (FIG. 1) and right side 39R of retroreflective bezel 27, while emitter 35R directs IR light to the bottom side 39B and left side 39L of bezel 27. Emitters 35L and 35R and bezel 27 are not in the fields of view 31L and 31R (FIG. 2). Thus, with reflectors 33L and 33R in their webcam mode positions, as shown in FIG. 2, neither the IR light 34 emitted by emitters 35L and 35R, nor the IR light 35 reflected by bezel 27 impinges on cameras 11L and 11R. IR cut filters 41L and 41R (FIG. 2) limit the light reaching cameras 11L and 11R to visible light so that the cameras 11L and 11R provide images that more closely match what a person sees and are not overwhelmed by IR light.

In FIG. 1, cameras 11L and 11R are connected to video processor 19, which performs processing of the digital signals from the cameras. Video processor 19 detects the positions of reflectors 33L and 33R to distinguish touchscreen and webcam modes. Video processor 19 communicates with other computer components using an internal USB connection. In alternative embodiments, IEEE 1394 (firewire) or other protocol connections are used. In a 3D gesture submode, the processing reduces the stereo images into a displacement map (distance information) that computer AP1 can then interpret and respond to as commands.

Light transmitting along display screen 21 can be blocked by an object touching or otherwise sufficiently close to display screen 21. When computer AP1 is in touchscreen mode (with reflectors 33L and 33R occluding fields of view 31L and 31R, shown in FIG. 2), video processor 19 can detect and locate the resulting shadows. Video processor 19 trigonometrically determines the 2D display screen location of the object by comparing the location of breaks (shadows) as seen by cameras 11L and 11R.

In FIG. 1, media 17 has computer-readable data and programs of computer-executable instructions encoded thereon. One such program is a touchscreen/webcam mode controller 43, which provides an interface for a user to switch between webcam and touchscreen modes for computer AP1. When a user switches to touchscreen mode, reflectors 33L and 33R are moved into and thus occlude fields of view 31L and 31R. A user can select webcam mode, by moving reflectors 33L and 33R to their webcam positions (FIG. 2), out of fields of view 31L and 31R. In the illustrated embodiment, reflectors 33L and 33R are moved manually by a user and the movement is detected by mode controller 43. In an alternative embodiment, the reflectors are motorized and controlled by mode controller software.

A user can select among several modes provided by video processor 19: 1) in touchscreen mode, video processor 19 determines touch locations; 2) in raw mode, video processor 19 provides a pair of raw video signals; in 2D webcam mode, a pair of raw video images (mostly for webcam mode); 3) in 2D webcam mode, video processor 19 combines raw images to provide merged 2D video images; 4) in 3D webcam mode, video processor 19 combines raw video images to provide 3D images; 5) in 3D command mode, video processor 19 combines raw video images to gestures which can be converted to commands. The latter mode provides for gesture-based control of computer AP1 as an alternative to touchscreen control. This gesture-based control can be modeless (no need to move reflectors 33L and 33R into position) and more comfortable than touchscreen control (some people begin to feel uncomfortable when holding out their arms for touchscreen operation for long periods of time).

Figure 4:
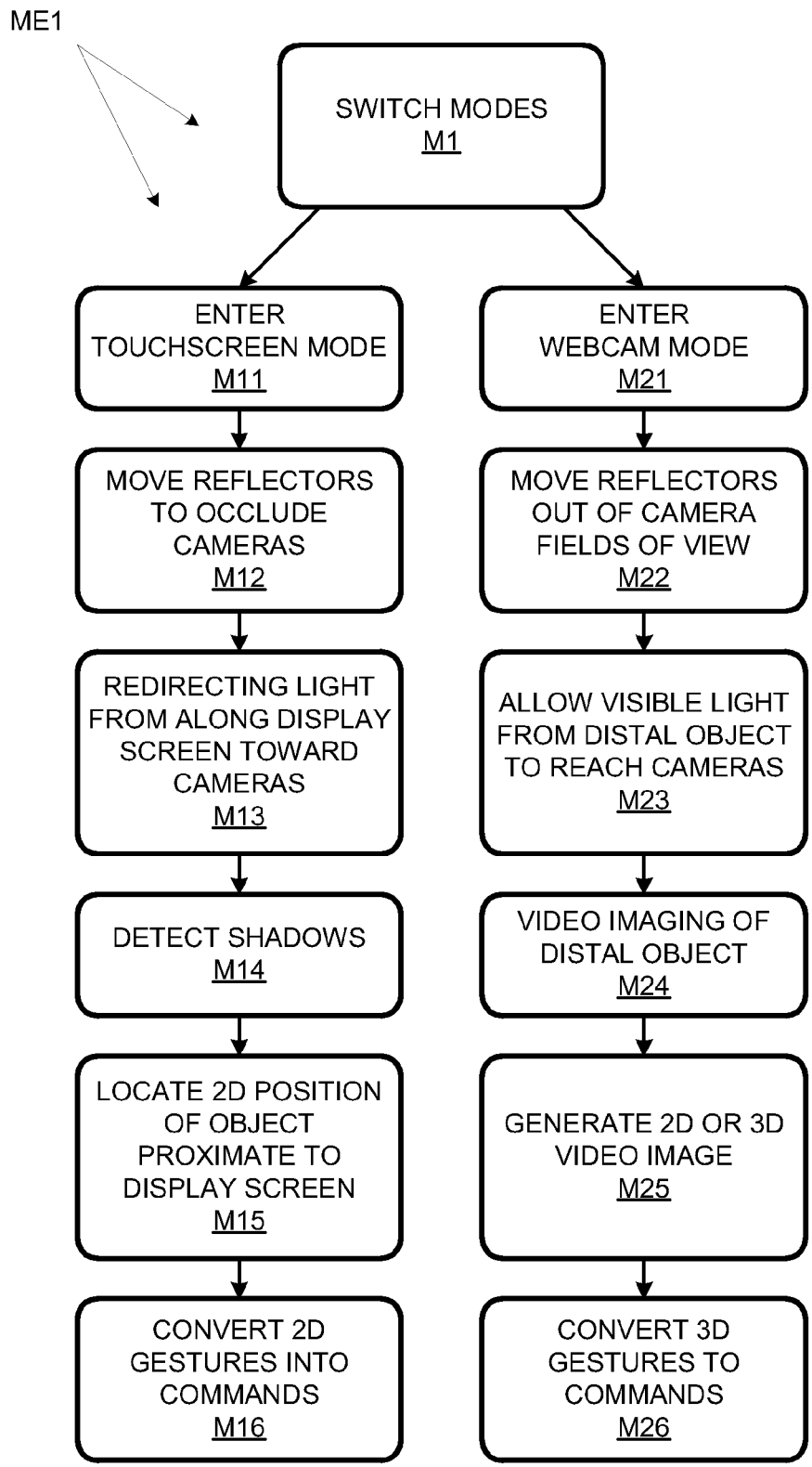
FIG. 4 is a flow chart of a method in accordance with an embodiment of the invention.

A method ME1 in accordance with the invention is flow charted in FIG. 4. At step M1, a user switches modes (e.g., by manually moving reflectors 33L and 33R) between a touchscreen mode M11 and a webcam mode M21. In the case the switch is to touchscreen mode M11, reflectors 33L and 33R are moved so that they occlude respective fields of view 31L and 31R of cameras 11L and 1R at step M12. In addition, IR emitters 35L and 35R can be turned on. Reflectors 33L and 33R redirect light from paths along and therefore more parallel to than orthogonal to display screen 21 to a path more orthogonal to than parallel to display screen 21 at step M13. If a finger or stylus or a similar object contacts or at least approaches the display screen, it will block light transmitting more parallel to than orthogonal to the display screen. In such a case, shadows can be detected in video images at step M14. The positions of shadows in the respective camera images can be used to locate a 2D position of the object relative to the display screen at step M15. This position information can be used to interpret two-dimensional gestures (touch, slide, etc.) so that the gestures can be interpreted (converted to) commands at step M16.

In the case that, at step M1, a user switches to a webcam mode M21, reflectors 33L and 33R are moved out of respective camera fields of view 31L and 31R at step M22; in addition, emitters 35L and 35R can be turned off. Removing reflectors 33L and 33R allows light transmitted more orthogonal to than parallel to the display screen to reach cameras 11L and 11R at step M23 without being redirected. This allows plural video images of a distal object, e.g., a user head, to be generated at step M24. The plural images can be combined to generate a unified 2D or 3D video image at step M25. In addition, 3D gestures detected in the video images can be converted to commands ("select", "move", etc.) at step M26.

The technology described herein provides for reducing the marginal cost of touchscreen technology by 1) using widely available and economical (webcam) cameras for touchscreen technology; and 2) arranging for the touchscreen components (e.g., cameras) to be used for other purposes (e.g., webcam functionality plus 3D gesture input). By providing for both touchscreen and gesture functionality, a bridge is provided between familiar touchscreen control and emerging gesture control technologies.

The foregoing description, for purposes of explanation, has been described with reference to specific embodiments. However, the illustrative discussions are not intended to be exhaustive or to limit the invention to the precise forms disclosed. Many modifications and variations are possible in view of the disclosed teachings. The embodiments were chosen and described in order to best explain the principles of the invention and its practical applications, to thereby enable others skilled in the art to best utilize the invention and various embodiments with various modifications as are suited to the particular use contemplated.

As used herein, "touchscreen" refers to any technology that is used to identify a position on a display screen that is contacted by a finger, stylus, or similar object. While some touchscreen technologies actually detect touch, the image-based technology described herein is not touch-based in that sense. Instead, the present invention detects position by imaging and it does not matter whether the object being imaged is actually touching the display screen or is only close enough to the display screen to interrupt light transmitted along the display screen.

Herein, "distal" means far enough from a display screen that it cannot be detected by light used to locate 2D position in touchscreen mode; in practice this can be one centimeter or more from the display screen. Herein, "proximal" means in contact with or near enough to be detected by light used to locate 2D position in touchscreen mode. Typically, proximal is less than one centimeter.

The invention provides for many alternatives to the illustrated embodiment. The invention provides for all-in-one and separate computer and display embodiments. The invention can be applied to appliances not typically considered to be computers (although they may include computer components), e.g., televisions and display panels on other devices such as printers. The cameras may be located in other places, e.g., bottom corners or along the sides of displays. More than two cameras can be used; e.g., a third camera at the center top or bottom can help resolve the location of an object touching the display. The standard center webcam might be combined with the stereo cameras to disambiguate two touches in a touch screen mode or to refine a displacement map as well as provide a savings on interface logic and circuit board cost.

The shape of the reflectors can be determined by those skilled in the art given that the opposing sides of the bezel must be within the cameras' field of view as modified by the reflectors. Depending on the embodiment, reflectors can translate or rotate between positions. Alternatively, a non-movable reflector can be used. For example, the reflector can be of material that can be electrically controlled so that it is more reflective or more transmissive. In another embodiment, the reflector works as a half-silvered mirror or beam splitter, allowing some light to pass (for touchscreen use) and some to be transmitted (for webcam use).

In the illustrated embodiment, infrared radiation is used in touchscreen mode and visible light is used in webcam mode. Other embodiments make use of this split spectrum to permit modeless operation or to provide for mode switching by switching spectra. In the illustrated embodiment, reflectors can be moved in position between an IR cut filter and a camera. In an alternative embodiment, the emitters and touchscreen functionality make use of visible rather than IR spectrum. This allows an IR cut filter to be coupled to the camera; rather than to be separated from the camera by the reflector. Instead of emitters being co-located with the cameras, the bezel can be emissive (either IR or visible spectrum). In another embodiment, cameras are rotated according to mode; in this embodiment, no reflectors are required. These and other variations upon and modifications to the illustrated embodiment are provided by the present invention, the scope of which is defined by the following claims.

What is claimed is:

1. A display system comprising:
a planar display screen that extends in two dimensions;
plural cameras having fields of view that extend more orthogonal to than parallel to said display screen for viewing distal objects;
reflectors to redirect touchscreen light from a direction along said display screen to a direction toward said cameras, said reflectors having a touchscreen condition and a webcam condition, said reflectors directing said touchscreen light only in said touchscreen condition, said reflectors detecting object light from distal objects when in said webcam condition; and
a video processor to locate a 2D position relative to said display screen of an object proximate to said display screen as a function of images generated by said cameras in response to said touchscreen light.

2. A display system as recited in claim 1 wherein:
said touchscreen condition involves touchscreen positions of said reflectors in which they occlude said fields of view; and
said webcam condition involves webcam positions of said reflectors in which they do not occlude said fields of view.

3. A display system as recited in claim 1 wherein said reflectors are movable so that a user can move them between said touchscreen positions and said webcam positions.

4. A display system as recited in claim 1 wherein said video processor provides for interpreting 3D gestures as commands.

5. A method comprising:
switching between a webcam mode and a touchscreen mode;
in said webcam mode,
imaging an object distal from a display screen using two or more cameras, and
generating a video image of said object; and
in said touchscreen mode,
reflecting light traveling more parallel to than orthogonal to said display screen so that it is redirected to be more orthogonal to than parallel to said display screen so that it impinges on said cameras, and
determining a position on a surface of said display screen contacted by an object as a function of said light impinging on said cameras.

6. A method as recited in claim 5 wherein said switching involves moving reflectors between:
a) positions at which they occlude fields of view of respective ones of said cameras; and
b) positions at which they do not occlude fields of view of respective ones of said cameras.

7. A method as recited in claim 5 further comprising, in said webcam mode, converting 3D gestures by said object into commands as a function of plural video images captured by said cameras.

8. A method as recited in claim 5 further comprising:
turning off infrared emitters when switching from said camera mode to said touchscreen mode; and
turning on said emitters when switching from said touchscreen mode to said camera mode.

9. A method as recited in claim 5 wherein said cameras are located at opposite upper corners of said display screen.

* * * * *